US006748737B2

(12) United States Patent
Lafferty

(10) Patent No.: US 6,748,737 B2
(45) Date of Patent: Jun. 15, 2004

(54) REGENERATIVE ENERGY STORAGE AND CONVERSION SYSTEM

(76) Inventor: Patrick Alan Lafferty, 11 Huffman Ave., P.O. Box 1045, Dayton, OH (US) 45402

( * ) Notice: Subject to any disclaimer, the term of this patent is extended or adjusted under 35 U.S.C. 154(b) by 97 days.

(21) Appl. No.: 10/006,454

(22) Filed: Nov. 19, 2001

(65) Prior Publication Data

US 2002/0060500 A1 May 23, 2002

Related U.S. Application Data

(60) Provisional application No. 60/249,851, filed on Nov. 17, 2000.

(51) Int. Cl.⁷ ............................................... F16D 31/02
(52) U.S. Cl. ........................................ 60/398; 290/44
(58) Field of Search ............................ 60/398, 413, 416, 60/404; 290/66

(56) References Cited

U.S. PATENT DOCUMENTS 2,539,862 A * 1/1951 Rushing ..................... 60/398
4,149,092 A * 4/1979 Cros .......................... 60/398
4,280,061 A * 7/1981 Lawson-Tancred .......... 60/398
4,498,017 A * 2/1985 Parkins ....................... 290/44
5,375,968 A * 12/1994 Kollitz et al. ............. 415/2.1
5,495,128 A * 2/1996 Brammeier ................. 290/4 R

* cited by examiner

*Primary Examiner*—Edward K. Look
*Assistant Examiner*—Igor Kershteyn
(74) *Attorney, Agent, or Firm*—R. William Graham

(57) ABSTRACT

A hydraulic circuit system and method for storing and converting hydraulic or mechanical energy to electricity wherein the hydraulic circuit system comprises: a power source for generating energy to produce electricity, a hydraulic power unit operably associated with the power source, one or more hydropneumatic accumulators operably associated with the hydraulic power unit, a hydraulic motor operably associated with the accumulators, a flywheel assembly operably associated with the hydraulic motor, a hydrostatic drive unit operably associated with the flywheel assembly, and a generator assembly operably associated with the hydrostatic drive unit wherein the generator assembly is further associated with the hydraulic power unit.

18 Claims, 1 Drawing Sheet

REGENERATIVE ENERGY STORAGE AND CONVERSION SYSTEM

CROSS-REFERENCE TO RELATED APPLICATION(S)

This application claims the benefit of U.S. Provisional Patent Application Serial No. 60/249,851 filed Nov. 17, 2000, which application is incorporated herein by reference.

FIELD OF THE INVENTION

This invention relates to a system for the generation and conversion of energy to electricity. More particularly, the present invention relates to an environmentally safe and economically effective manner of generating and storing energy until it is needed by using a regenerative energy storage and conversion system.

BACKGROUND OF THE INVENTION

There are several currently available technologies that can be used by the wind energy industry for energy storage purposes. First, there are the conventional standby energy storage devices—batteries. Besides being environmentally hazardous, batteries take up a lot of physical space. They must utilize either a direct current (DC) electrical generator or an inverter in order to reconvert from battery power to alternating current (AC) so that their power can be utilized by the existing power grid. Industrial batteries last an average of about 10 years and are very expensive to replace. They also suffer from corrosion, and sometimes can create fires and cause explosions. Eventually, batteries create a disposal problem and pose a health hazard for society.

Second, the electricity from a wind turbine can be utilized to run a water pump which can then be used to place water behind a storage dam. When the wind has stopped, one simply releases the water from the reservoir through a conventional hydroelectric mechanism to produce whatever electricity is required. This process can and does work if you find wind turbines situated next to an existing dam. Otherwise, this arrangement can be an extremely impractical and expensive method of storing wind energy for later production of electricity.

Third, the wind energy could be stored in the form of compressed air. Some firms have air compressors mounted in their wind turbines or on the ground to produce compressed air energy. Then, it is later released to run a compressed air motor/turbine to generate electricity. Again, in order to store copious amounts of this type of energy, one must find oneself adjacent to an abandoned mine or underground caverns. Otherwise, this endeavor is an extremely expensive proposition. Further, it is also an expensive proposition to run compressed air through a compressed air turbine (like a steam turbine) to turn an electrical generator because it requires huge volumes of energy to operate such a device.

Fourth, the energy may be stored in hydraulic accumulators. However, like the compressed air storage system, hydraulic accumulators are an expensive proposition relative to the large volume of stored oil energy (necessary to accomplish) the task of generating commercial amounts of electric energy.

Fifth, a flywheel, such as one of the newer, high speed, composite flywheels may be used to store energy. Flywheels are claimed to be an inexpensive and compact method of storing energy; however, the use of such high speed, composite flywheels pose both safety and engineering/technological obstacles that have yet to be solved for this application. For example, a flywheel of this high speed design must spin at 40,000 to 100,000 rpm in order for it to work properly, and it must be placed in a wind turbine at a height of 30 to 80 meters, which placement automatically limits the size of the device that can be used. As such, the flywheel actually appears to be an expensive and impractical proposition.

While all of these methods have been utilized in one form or another over the years, the wind industry has not thought to combine several of them in a packaged approach to comprise an effective regenerative energy storage and conversion system.

BRIEF SUMMARY OF THE INVENTION

The present invention is conveniently and economically located on the ground where it can be easily installed, maintained and repaired. This invention has the ability to work in a very favorable manner with a wind turbine or stand alone in an industrial setting to provide electrical power to meet peak demands or provide back-up electric power generation without using fossil fuels.

Also, the invention may be used as a stand alone propulsion system that can power electrical devices and pumps, and/or power or augment existing conventional propulsion systems an example of which might be for ocean going tankers or large commercial ships. The present invention combines several of the wind energy industry's techniques that, to date, have had little success with converting, storing, and regenerating any significant amount of energy.

The wind energy industry tests for the highest wind speeds at a potential site and then, knowing that a particular wind speed is available at that site during that time period, they build to meet that highest capacity. Unfortunately in most cases, the maximum wind energy is available only a fraction of the time. Regardless, the renewable energy industry boasts to the public about how many kilowatts they add to the grid, but the truth is that one must be realistic and review the actual recorded electrical output of the turbine on an annual basis. And after a thorough economic examination, one finds that this source of potentially free energy is neither reliable, nor efficient.

For example, if the rated output of the turbine is compared with the actual metered electricity produced, there is a huge disparity. And, if one compares that statistic with the 24 hours in a day that the wind energy device is available but not producing electricity, one can see a gap widening in not only rated capacity but also in that basic connection between the available energy needed to meet the needs of customers 24 hours a day. Available capacity rarely meets rated capacity, nor is it available much of the time when it is needed by the customer.

Since wind is not thought to be a dependable source of energy, it is useful to consider the overall percentage of time that wind turbines are producing electricity out of the 100% time that they are available. Statistics range from 15% to 23% in actual electric output per year compared to that 100% availability. However, in a comparison to coal (75 to 85%), natural gas (95%), or nuclear energy (75%), wind has the lowest actual electric output per year. Clearly, these other competitive sources of electric power have significantly higher rates of reliability. More importantly, every one of them is available 24 hours a day, seven days a week no matter what the weather conditions.

Other advantages of the invention are disclosed within the following description and drawings.

BRIEF DESCRIPTION OF THE DRAWING

The FIGURE is a schematic diagram of the hydraulic circuit of a regenerative energy storage and conversion system of the present invention.

DETAILED DESCRIPTION OF THE INVENTION

Figure 1:
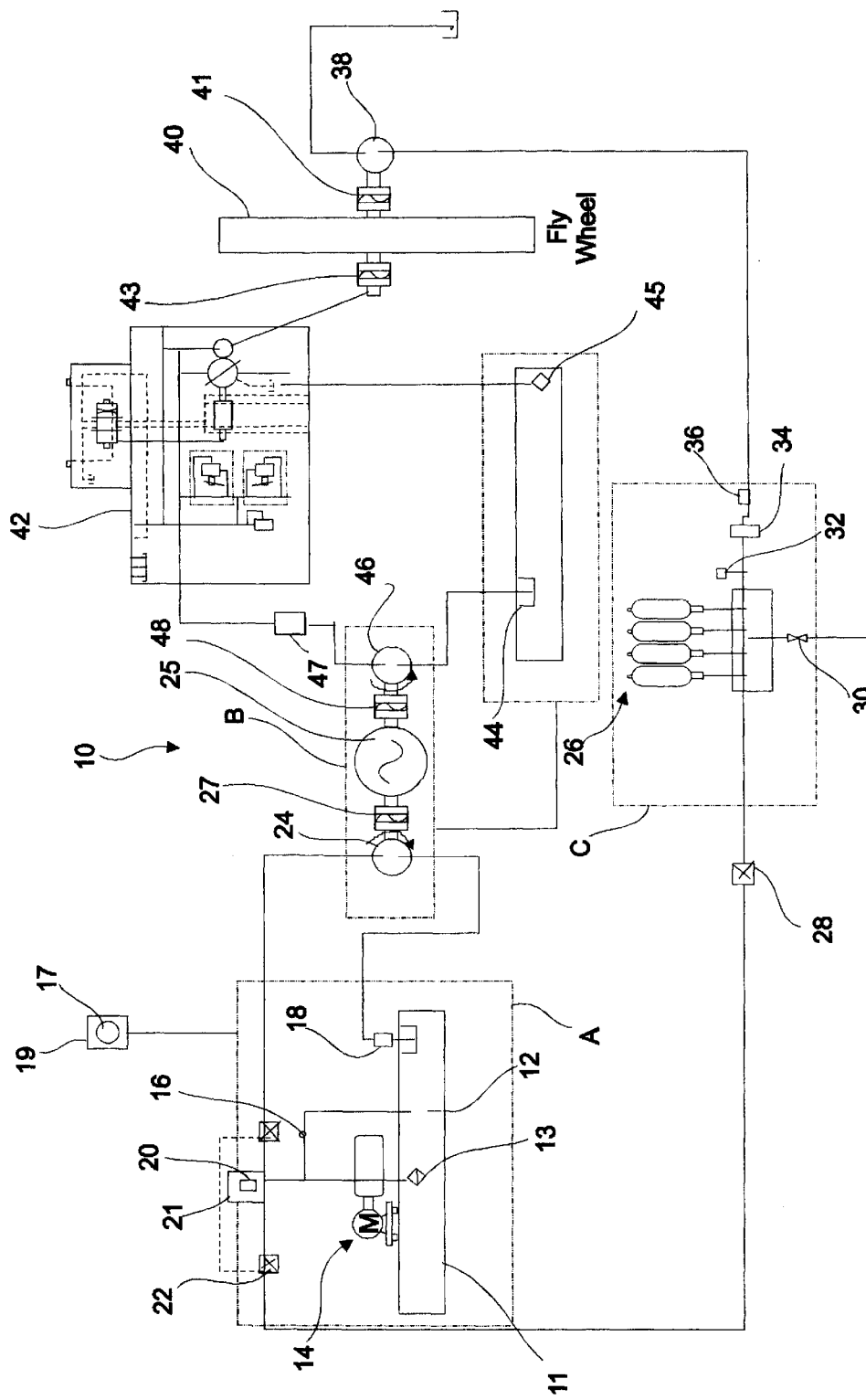

In seeing a need and endeavoring to meet it, herein is disclosed an energy storage device that can be favorably utilized to adjust for the peaks and valleys of wind energy production. This invention can provide energy when the wind is unavailable or when the demand of the utility or the customer calls for it. In this way, both the capacity of the wind operated electric turbine is available in real time, and the system of the present invention is also capable of simultaneously producing electricity.

Referring now to the drawing, the FIGURE is a basic schematic diagram of a preferred embodiment of the hydraulic circuit 10 of the regenerative energy storage and conversion system of the present invention as described herein. A hydraulic power unit 11 shown within the dotted-lined box marked "A" (power circuit) is operated by an electric wind turbine 17 located in a tower 19 that produces DC electric power. Without a need for a DC converter, DC electric energy is generated in real time to operate the power circuit "A". Hydraulic fluid such as hydraulic oil is drawn from the reservoir 12 through a screen/hydraulic filter 13 and into the pump and motor assembly 14. Pressure relief valves 16 and 18 are necessary to protect the pump and motor 14 in the circuit 10.

The power circuit "A" also includes a port 20 to mount a pressure gauge 21 for test purposes. A sequence valve 22 is also included which allows the flow of the hydraulic oil in power circuit "A" to reach the electric generator 25 (dotted-lined box marked B). When the flow requirement (gallons per minute G/M)) has been met, the sequence valve 22 opens allowing excess oil to flow to the bank of hydropneumatic accumulators 26 inside the dotted-lined box marked "C" where the hydropneumatic accumulators begin to store surplus energy created by the hydraulic power unit 11 and thus build up hydraulic pressure for future use. While hydropneumatic accumulators are specifically described, other types of accumulators such as spring loaded, weight loaded, cylinder versions, etc. can also be used.

Once the oil flow has passed through the check valve 28, it builds up pressure against nitrogen bladders (not shown) contained inside the steel shells of the pressurized accumulators 26. A manual discharge valve 30 is provided for relieving pressure within the accumulators 26 in case of needed maintenance or repairs. This valve 30 safely relieves hydraulic pressure from the system and is a standard in the industry.

The Figure further shows a pressure gauge port 32 provided for test purposes and shows a manual directional control valve 34 that releases the pressurized oil flow contained in the hydropneumatic accumulators 26 to a sequence valve 36. After passing through this sequence valve 36, the hydraulic oil flow first energizes a hydraulic clutch, fluid coupling, arbor, clamping device, etc. (not shown). After completing this task, the sequence valve 22 then opens a second time to energize a hydraulic motor 38.

After the hydraulic motor 38 has energized the flywheel 40 through hydraulic clutch 41, it transfers its energy to a similar hydraulic clutch, simple universal joint or coupling 43 on the opposite or left side of the flywheel 40 and to the closed loop 42 of the hydrostatic drive unit. After hydraulic oil is pumped, from its self-contained hydraulic reservoir 44, the oil passes first through a filter 45 and then through its charge pump, main pump and through an internally mounted, factory set pressure compensated flow control device 47. The flow is precisely metered to the waiting needs of the hydraulic motor 46 attached to the electric generator B, but first operating a hydraulically operated device 48 such as a hydraulic clutch, fluid coupling, etc. This precisely metered flow matches the exact needs of the hydraulic motor 24 operating the electric generator 25, so that it is possible to maintain the exact RPM requirements of the electric generator 25. In so doing, it is possible to ensure the exact Hertz of the electric current it is able to produce and it then allows this electric current to pass directly through a measurement or recording device (not shown) and into the waiting utility grid (not shown).

In the interim, the hydraulic device 27 on the opposite shaft end of the electric generator (alternator) 25 loses its pilot pressure or other signal which allows this hydraulic (coupling) device 27 to mechanically disconnect from the generator 25. In this unpressurized condition, the hydraulic (coupling) device 27 can now free-wheel and this principle hydraulic motor 24 is temporarily removed from the circuit "A", thus preventing a potentially dangerous situation where this now surplus hydraulic motor 24 could possibly become a pump by running in the opposite direction. If that were the case, it could cause potential pressurization problems elsewhere in the circuit "A" and would need to be hydraulically unloaded by a cross port relief valve or other specialized valving that is commonly utilized for this purpose.

Any investor in wind energy, or those who operate it or consume power from it, would welcome such an invention because it now would make this energy source more reliable while having the capacity to produce electricity that exceeds the 15%–25% actual electrical output that industry spokesmen and statistics have reported. Though we do not have any statistics of our own, this invention may in fact increase actual electrical output by a factor of 30% to 50%.

The proposed energy storage and conversion device of the present invention can be utilized in a number of flexible and energy efficient aspects which include several regenerative embodiments. The three basic aspects of the energy storage and conversion device of the present invention include:

In a first aspect of the invention, there is provided energy transfer and storage through improved utilization of a portion of the electricity generated using wind turbine technology wherein some of the electricity already generated is used with the intention of leveraging the energy in the present energy storage and generation mechanism.

In a second aspect of the invention, energy storage is accomplished by converting or augmenting the wind energy turbine mechanism from its current technological form. The current form operates by transferring wind through a series of wind capturing blades to a mechanical transmission device and then to an electric generator. One can substitute a hybrid device behind the mechanical transmission. The hybrid device should include a variable displacement hydraulic pump or combination of pumps and a smaller electric generator. A mechanical transmission may or may not be utilized depending upon the input speed or inherent nature of the wind turbine design. For example, some vertical turbines rotate much faster than do the horizontal units.

If off-the-shelf hydraulic components are utilized, the circuit first begins to function by drawing oil from a reservoir on the ground, up through a series of check valves, and into wind actuated variable displacement pumps where the oil is pressurized and sent back under pressure to the ground. The oil is then transferred to a small power building that is preferably situated adjacent to the wind turbine's tower.

In the tower, there is at one's disposal either of two types of energy with which to work. These two types of energy include (1) conventional wind energy conversion technology consisting of an AC or DC electric generator, or (2) a hydraulic version utilizing variable displacement hydraulic pump or pumps. Alternatively, a third hybrid version could be provided comprising both a single variable displacement hydraulic pump and a smaller electric generator (AC or DC) utilizing a downsized electric generator in the wind turbine itself, which could be run directly off the gear box or off a hydraulic sub-circuit. This could in fact be a modified unit like those supplied to the aircraft industry and which run off the main propulsion system of the aircraft. One example is that of a unit made by the Sunstrand Corporation.

Here is how each of the above described devices would operate:

With regard to the first device, in the event an all electric version utilized in almost all wind energy turbines worldwide is employed, a very small amount of the electricity produced by the wind turbine will be used to operate a commercially available hydraulic power unit located in a power building on the ground. This hydraulic power unit operates a hydraulic pump to charge banks of manifolded hydropneumatic accumulators that also are located in the power building. When the wind is no longer available, stored hydraulic energy is leveraged in a unique manner to convert the stored energy back into a standard utility grid form of electricity.

With regard to the second device, in the event the turbine design is all hydraulic, its generated flow will be transferred to the ground-level power building where it will operate a hydraulic motor that drives a large conventional electric generator located in the ground-level power building. The generator has a conventional output, but it will be specially equipped with two input shafts located at either end of the generator. This setup allows generation of standard electricity with conventional utility grade electric components in real time. Whatever available capacity in gallons per minute flow is produced by the variable displacement wind turbine's hydraulic pump or pumps, now determines what it can do with this pressurized energy on the ground.

If, for example, the output of the hydraulic pump or pumps mounted in the tower are singularly or in combination in excess of 300 GPM, e.g., 310 GPM, and there is an electric generator (alternator) on the ground in a power plant building that requires 100 GPM to operate at its rated electrical capacity, one can still run several other similar electric generators (alternators) as long as the demands of the first and other secondary units are met by the pump or pumps in the wind capturing tower.

However, if one successfully operates three electric generators (alternators) and there is an extra 10 GPM left over, one can divert this surplus to the banks of manifolded hydropneumatic accumulators for storage. When the wind is no longer available, one can convert this stored hydraulic energy back into electric energy.

In either of the first two versions, we have now converted the two forms of wind generated energy into stored hydraulic energy. This is accomplished using electric generating equipment in the first example to power a standard hydraulic power unit mounted on the ground, and in the second example one or more variable displacement hydraulic pumps is substituted for the electric generating equipment that was previously mounted in the turbine behind the wind capturing blades. As such, these units produce the hydraulic energy needed to operate the standard electric generator on the ground and after that demand is met in real time, some of the surplus hydraulic energy remaining from the hydraulic energy produced to meet the immediate need may be sent to the manifolded banks of hydropneumatic accumulators where it is stored until needed.

The third aspect of the invention includes an all hydraulic circuit. However, in this case a sub-circuit would divert a small amount of the available flow to the generator such as a Sundstrand type aviation generator, where it runs a hydraulic motor connected to a variable speed, constant frequency electric generator having it's speed internally adjusted through an internal servo system or an external pressure compensated flow control. In addition, this aspect would provide, through its self-contained hydraulic circuit, hydraulic oil that would cool its internal parts as is currently practiced in aircraft applications. Another option for cooling its internal parts would be to divert some of the motor's hydraulic oil that already is utilized to run the hydraulic motor coupled to the variable speed, constant frequency generator.

In the interim, this hybrid device would be able to simultaneously deliver hydraulic energy to the ground in real time to operate a large commercial electric generator. At the same time, the generator, such as a Sundstrand unit, would produce electricity to operate a commercial hydraulic power unit on the ground which would store hydraulic oil energy in the banks of manifolded hydropneumatic accumulators until later needed when the wind was unavailable.

Having described three preferred methods of operation for charging up the banks of hydropneumatic accumulators, the following is a description of the operation of the sub-circuits for converting the stored hydraulic energy back into electricity on demand.

Assuming that the wind has stopped or the wind turbine is unavailable (e.g., when it being worked on), the first thing one would do is actuate a directional control valve, which would allow oil to flow from the banks of the manifolded hydropneumatic accumulators to a hydraulic sequence valve. In that valve body, the delivered flow of oil would first be directed to reach a hydraulic clutch or other hydraulic component capable of transferring rotary motion. It would then energize that hydraulic transfer device. The hydraulic clutch or other hydraulic transfer mechanism would be permanently attached to the axle of whatever appropriately sized flywheel storage device is employed. It might be 1000 pounds or it could be 100,000 pounds.

Next, the sequence valve, having already allowed oil to reach and energize the hydraulic clutch or other hydraulic or other hydraulic transfer mechanism (e.g., fluid coupling, hydraulic arbor, rotating cylinder, etc.), now would open a second passage and allow additional oil flow to reach a hydraulic motor that is attached to either the hydraulic clutch or to another hydraulically operated transfer mechanism. Once the hydraulic motor begins to rotate, its energy would be transferred through the clutch or other hydraulic transfer mechanism to a large flywheel adding whatever horsepower and rpm desired to reach a specified speed.

The flywheel gains speed from hydraulic energy being introduced through it's axle shaft. Attached to it, and being mechanically energized by that output shaft is a self-contained, fluid coupling or other rotary transfer mechanism which is permanently attached to hydraulic pump that is part of a completely autonomous hydraulic sub-circuit. It is not connected to the main hydraulic circuit in any way and no hydraulic fluids are interchanged within these two very different hydraulic systems.

This pump is part of a closed loop hydrostatic drive or transmission which powers the electric generator. The electric generator is being turned by a hydraulic motor whose input flow has first passed through a pressure compensated flow control valve. This hydraulic component is used because, no matter what the speed of the flywheel or the subsequent output flow the hydrostatic pump produces, the input flow to the hydraulic motor operating the electric generator will be precisely regulated by the pressure compensated flow control. This carefully monitored and controlled process insures that the electrical output of the electric generator (alternator) is exactly what the utility or customer wants.

Further, the hydrostatic drive is virtually unaffected by the speed of the flywheel as long as the input horsepower to the closed loops pump is over and above whatever energy is required to produce the flow necessary to meet the input demands of the pressure compensated flow control. This is because of the unique ability to stroke or destroke the swashplate of the variable output pistons which regulate the output of the pump as the flywheel slows. Thus the electric generator's hydraulic motor is provided with the gpm flow necessary to successfully operate the circuit for long periods of time, e.g., hours or days or even weeks.

The following is a description of the regenerative characteristics of this circuit which offers the customer several flexible design options.

After the ground mounted electric generator begins to create electricity through the utilization of the flywheel-hydro-generator circuit, one can leverage this source of energy to operate the electric motor driven commercial hydraulic power unit. By operating this device, one can re-energize, recharge or replenish the banks of now-depleted or partially depleted hydropneumatic accumulators, and once again deploy them in one of two very different manners.

In one example, the flywheel comes to a complete dead stop and the hydropneumatic accumulator are used as hydraulic self-starters to re-energize the flywheel. In another example, the hydropneumatic accumulators are utilized in a very leveraged manner by "pulsing" energy to the flywheel while it is still in motion. In so doing, one simply maintains the flywheels intended speed for as long as possible according to the laws of physics knowing full well that frictional losses, such as horsepower losses due to the operation of the hydraulic components or horsepower losses caused by the electric generator, and losses due to gravitational forces are playing a part in slowing it down and must be addressed.

However, in lieu of using electric power from the ground mounted electric generators circuit, it may be more economical to deploy an additional hydraulic motor in the hydrostatic drive circuitry. This should be done only after meeting the principal demands of the first hydraulic component in the circuit. That is the hydraulic motor attached to the electric generator. After utilizing the flow, one can then begin to operate the additional hydraulic motor. The additional hydraulic motor would be attached to another hydraulic pump which is used in a similar manner to the hydraulic power unit in that it simply re-charges or replenishes the manifolded banks of hydropneumatic accumulators.

In either of these entirely different cases, one electric and one hydraulic, a regenerative means of energy use has been employed. It should be noted that one obviously also could use electric power, such as from solar cells, to charge up batteries and then convert DC energy to hydraulic energy to replenish the manifolded banks of hydropneumatic accumulator.

Finally, in the case of the hybrid version (hydraulic and electric), one would use whichever of the two energies are available depending upon the estimated dwell period necessary to replenish the manifolded banks of hydropneumatic accumulators. If the flywheel device was already running and producing electricity, one might decide to divert the output flow from the variable displacement hydraulic pump contained in the wind turbines tower and simply recharge the accumulators in a more efficient manner rather than using the commercial hydraulic power unit on the ground in the power building. Obviously, various sensors would be able to analyze which options were available and which would be deployed in the most effective manner.

Eventually the flywheel mechanism will slow down because of the horsepower being taken from it to produce the electricity, i.e., because of gravitational forces and frictional losses, etc.

Once again, one could deploy the banks of hydropneumatic accumulators for a second, third, fourth, or more times in an attempt to leverage use of stored hydraulic energy. It is obvious that it takes much more energy to start a static load and bring it up to full rotating specification speed, than the smaller amount of energy required to keep the flywheel device in a state of motion.

This approach is herein referred to as a pulsing circuit" approach to solving this problem. In doing so, one utilizes the least amount of energy possible to conserve the hydraulic energy that is already stored while at the same time increasing the dwell times between recharging of both the banks of hydropneumatic accumulators and meeting the ongoing, but intermittent horsepower needs of the flywheel.

The above description disclosed how the circuit operates with wind energy, and the following describes how the circuit operates in industrial applications where no true renewable energy is available.

In this example, one could visualize tapping into an existing hydraulic system of a huge industrial piece of machinery and borrowing all or a small amount of this device's hydraulic pump capacity with which to charge the waiting banks of hydropneumatic accumulators. This borrowing can be done during the dwell period of machines. The dwell period is when many machines operate while one or more operations are waiting to be completed. In many cases, the hydraulic power units of these available machines continue to run during this dwell period, but accomplish no work. Conversely, the pump may not be running at all, but is available for the intended purposes. In either of these cases, one has the ability to charge up the banks of accumulators so that they eventually will be available to produce electricity when needed to meet the electric needs, e.g., in a plant's many operations.

In another example, an electric power customer may decide to substitute his current diesal powered back-up generator for that of a hydraulic actuated, flywheel driven hydrostatic driven generator/alternator, such as that used by a hospital during power outages. If they need this electric power, instead of hitting a start switch on their fossil fueled engine, they could instead switch a directional control valve on their hydropneumatic accumulators which in turn would start their flywheel with virtually no noise and no pollution byproducts as it begins to produce their electric power. Accordingly, the customer has available to him a stand alone power supply or, depending upon his needs, a unique propulsion system with which to provide a silent, non-polluting form of energy suitable for a variety of industrial needs.

Others, in addition to hospitals, who could use these stand alone power units include military and government installations that also use fossil fuel units for back-up electrical generation purposes. And, large apartment buildings or subdivision could use these units to generate their own power in light of utility deregulation. There are also many heavy electric energy users like foundries, glass plants, steel producers, and fabrication plants that use hundreds of electric welders in their operations. All might be in the market for an efficient energy producing device that could produce some, if not all of their electric needs.

Some might want the device just to operate when they are near their peak demand for electricity and do not want to exceed it because of possible penalties and a certain new rate hike. Further, others are concerned about pollution and the associated costs of any kind of fuel. Also, this device could be utilized to run a large hydraulic pump instead of an electric generator. Then, if for example, one operated a large steel plant or a die casting or plastic injection molding factory with many similar machines on the factory floor, one might want to consider centralizing the hydraulics for the entire plant and in so doing cut the electric energy bill significantly.

Also, if one mounts several wind turbines on ocean going tankers, there is the ability to take advantage of high winds and perhaps poor weather conditions by transferring the wind generated hydraulic energy to one or more hydraulically operated screws adjacent to the vessels diesel operated main propulsion system. This might enable the ship's operators operator to make better time to the next port thereby cutting costs. It may be the principal method of providing energy to the ship, or it could simply augment the existing diesel engine's propulsion system.

The most preferred embodiment of this invention comprises an all hydraulic system provided with a hydraulic circuit(s), whether it is used for wind or for a similar operating system utilized in the operation of a hydroelectric dam.

In this instance, one must mount many smaller hydraulically operated turbines in a significantly smaller structure on the river to transfer the hydraulically captured energy to the banks of the river and then generate power in a flywheel equipped power plant. One does not need a large dam structure because that is normally where the electric turbines are housed. Further, one does not have to operate the electric generators in real time from their hydraulic pumps (although this could be done) attached to the water turbines in their pinstocks, but only long enough to capture enough energy to pre-charge the banks of hydropneumatic accumulators to start our waiting flywheel devices. There is never going to be the dwell period of time where one has to wait long periods of time to collect enough renewable energy to "pulse" the flywheel since one has a waiting reservoir of water built up behind the dam. All one must do is occasionally operate one or more of the hydraulic pumps located within the dam and to replenish or recharge the hydraulic accumulators located in the power plant adjacent to the dam. One might even designate one or more of these water activated hydraulic pumps for this specific task and then utilize the others for real time electric power generation.

However, what is accomplished in this and other renewable circuits could also be accomplished through other means and using other forms of energy.

For example, if one would use electrical energy generated from any source, whether it be renewable or not, i.e. hand pumped hydraulic, wind, solar cell, ocean wave, hydroelectric, wood, coal, oil or natural gas to generate electricity directly or indirectly and then run a commercial hydraulic power unit, one would be able to charge up the hydropneumatic accumulators. Then one can use them either when the renewable energy is unavailable to meet utility or power requirement demands or as back up when power has been interrupted.

Next, there is a possibility of utilizing the wind slipstream created by automobile and truck traffic and in so doing run a short, vertical hydraulic wind turbine. This device would be placed in an aerodynamic enclosure in the median between the opposite directions of traffic flow, optionally under a bridge floor in a horizontal configuration, or finally it could be energized by means of short stroke, single action (with spring return or accumulator-provided hydraulic springs or return devices) return cylinders to charge up banks of hydropneumatic accumulators located in small power sheds along side the interstate highway system.

If one can envision thousands of trucks, buses and automobiles going over a slight incline with these single action hydraulic cylinders pumping pressurized oil to the accumulators, it is easy to see that it would not take long to build up a significant amount of oil under pressure with which to start another flywheel operated electric generator.

At dusk, the hydropneumatic accumulators would discharge starting a small flywheel-driven electric generator that would operate the lights on highway signs, street lighting and finally, as a byproduct, provide latent heat to keep the interstate highway systems bridges warm and free of ice and snow during winter. In these optional cases, the oil reservoir would be buried in the bridge floor in the form of hundreds of feet of plastic tubing like that used to heat homes and commercial buildings.

In yet another example, a similar shortened, vertical axis driven wind turbine placed between the median of the interstate highway system could produce just electricity from conventional electric alternators without the use of a hydraulic pump. It could then send this electric energy to a mini-power plant where it could again run a similar hydraulic power unit which would once again be used to charge up banks of hydropneumatic accumulators. These would once again later be discharged to run a flywheel actuated hydrostatic transmission that would run an electric generator. Even in these instances, a gas service station or a fast food restaurant could take advantage of the electric power generated by the traffic of the interstate highway system to either purchase electric power from the state or federal government, or own the electric power generation systems themselves.

Finally, one might use an electric motor and gear box, and electric motor and hydrostatic transmission, an electric motor and air compressor with compressed air storage receivers and air motor/gear box combination, or steam turbine and gearbox to move the flywheel from a static condition to a fully rotating stored energy configuration. Once the flywheel is operating at specification speed and capable of operating the hydrostatic drive, it would begin to run the electric generator.

In any of the above examples, one again would utilize some of its energy output in a regenerative fashion to operate either a hydraulic power unit, an air compressor or the same electric motor/gearbox/hydrostatic transmission to put energy back into the flywheel as it begins to slow down, thus keeping the device operating and generating electricity over an extended, but as yet to be determined, period of time.

Although the invention has been described and illustrated with respect to specific embodiments, it will be readily apparent to those skilled in the art that various changes may be made without departing from the spirit and scope of the invention.

What is claimed is:

1. A hydraulic circuit system for generating and converting hydraulic or mechanical energy to electricity comprising:
   a power source for generating energy to the hydraulic circuit system to produce electricity;
   a hydraulic power unit operably associated with said power source;
   banks of one or more hydropneumatic accumulators operably associated with said hydraulic power unit;
   a main hydraulic motor operably associated with said one or more hydropneumatic accumulators;
   a flywheel assembly operably associated with said main hydraulic motor;
   a hydrostatic drive unit operably associated with said flywheel assembly; and
   a generator/alternator assembly operably associated with said hydrostatic drive unit, said generator assembly further associated with said hydraulic power unit.

2. The hydraulic circuit system of claim 1 wherein said hydraulic power unit comprises an electric motor/pump assembly and a hydraulic fluid reservoir.

3. The hydraulic circuit system of claim 2 wherein said hydraulic power unit further includes a screen/filter through which hydraulic fluid pumped from said hydraulic fluid reservoir passes to said motor/pump assembly.

4. The hydraulic circuit system of claim 1 wherein said hydraulic power unit further includes at least one pressure release valve.

5. The hydraulic circuit system of claim 1 wherein said hydraulic power unit further includes a sequence valve for permitting said hydraulic fluid to sequentially flow between said power unit and said generator assembly, and between said hydraulic power unit and said banks of one or more hydropneumatic accumulators.

6. The hydraulic circuit system of claim 1 wherein said hydraulic power unit further includes a port into which a test pressure gauge can be mounted.

7. The hydraulic circuit system of claim 1 further including a check valve between said hydraulic power unit and said one or more hydropneumatic accumulators for permitting hydraulic fluid pressure to build up within said one or more hydropneumatic accumulators.

8. The hydraulic circuit system of claim 1 further including a discharge valve adjacent said one or more hydropneumatic accumulators for relieving pressure within said one or more hydropneumatic accumulators.

9. The hydraulic circuit system of claim 1 further including a directional control valve associated with said one or more hydropneumatic accumulators for releasing pressurized hydraulic fluid contained in said one or more hydropneumatic accumulators to a sequence valve through which said pressurized hydraulic fluid flows to energize said main hydraulic motor.

10. The hydraulic circuit system of claim 9 wherein said flywheel is associated with said energized first hydraulic motor to cause said flywheel assembly to become energized.

11. The hydraulic circuit system of claim 10 wherein said energized flywheel assembly is associated with said hydrostatic drive unit to cause said hydrostatic drive unit to become energized.

12. The hydraulic circuit system of claim 11 wherein said energized hydrostatic drive unit is associated with said generator system to cause said generator system to become energized.

13. The hydraulic circuit system of claim 1 further including a port associated with said one or more hydropneumatic accumulators into which a test pressure gauge can be mounted.

14. The hydraulic circuit system of claim 1 wherein said flywheel assembly comprises:
    a flywheel for use in energizing said hydrostatic power unit;
    a first hydraulic clutch on a first side of said flywheel wherein said first hydraulic clutch is operably associated with said first side of said flywheel and with said main hydraulic motor; and
    a second mechanical device on a second side of said flywheel wherein said second mechanical device is operably associated with said second side of said flywheel and with said hydrostatic drive unit.

15. The hydraulic circuit system of claim 1 wherein said hydrostatic drive unit comprises:
    a charge pump operably associated with said flywheel;
    a hydraulic motor operably associated with said electric generator/alternator assembly;
    a hydraulic fluid reservoir operably associated with said hydrostatic drive unit;
    a filter operably disposed between said hydraulic fluid reservoir and said hydrostatic drive unit through which hydraulic fluid from said hydraulic fluid reservoir flows to said hydrostatic drive unit; and
    a flow control device for precisely metering the flow of said hydraulic fluid to said hydraulic motor.

16. The hydraulic circuit system of claim 15 wherein said generator system comprises:
    an electric generator;
    a first hydraulic motor operably associated with and disposed between a first side of said electric generator; and said fluid control device; and
    a second hydraulic motor operably associated with and disposed between a second side of said electric generator opposite said one side of said electric generator and said hydraulic power unit.

17. The hydraulic circuit system of claim 1 wherein said power source is at least one of a wind mill, a wind turbine, water currents, ocean waves, gravity, solar cells, steam power, batteries, hydraulic cylinders and pressurized gas.

18. A method for storing and converting energy to electricity comprising:
    providing a power source for generating energy;
    pumping a hydraulic fluid from a reservoir containing said hydraulic fluid in a hydraulic power unit to one or more banks of hydropneumatic accumulators wherein said generated energy powers a pump causing said hydraulic fluid to flow under pressure to said one or more hydropneumatic accumulators;
    causing said hydraulic fluid to discharge from said hydropneumatic accumulators under pressure and flow to a main hydraulic motor wherein said hydraulic fluid energizes said main hydraulic motor;
    causing said energized main hydraulic motor to further energize a flywheel wherein energy is transferred to a hydrostatic drive unit; and pumping stored hydraulic fluid from a second hydraulic fluid reservoir in said hydrostatic drive unit to a generator assembly wherein the flow of said hydraulic fluid from said second hydraulic fluid reservoir is precisely metered to a hydraulic motor in said generator/alternator system to maintain the exact RPM requirements of the electric generator/alternator and insure the exact Hertz of the electric current produced.

* * * * *